US006801790B2

(12) United States Patent  
Rudrapatna

(10) Patent No.: US 6,801,790 B2  
(45) Date of Patent: Oct. 5, 2004

(54) STRUCTURE FOR MULTIPLE ANTENNA CONFIGURATIONS

(75) Inventor: Ashok N. Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 542 days.

(21) Appl. No.: 09/764,791

(22) Filed: Jan. 17, 2001

(65) Prior Publication Data

US 2002/0132600 A1 Sep. 19, 2002

(51) Int. Cl.$^7$ .................................................. H04B 1/38
(52) U.S. Cl. ........................ 455/562.1; 455/277.1; 455/575.1; 342/374
(58) Field of Search ........................... 455/277.1, 19, 455/82, 562.1, 121, 279.1, 129, 422, 424, 509, 561, 575.7, 575.1, 550.1, 272, 273, 276.1, 274, 101, 103; 342/373, 361, 362, 368, 372, 374; 375/267, 299, 298, 146, 285; 370/204, 209, 210; 343/725, 789, 853, 893, 844, 872, 890, 797, 700, 803, 816, 817, 818, 819, 368, 810, 892, 354

(56) References Cited

U.S. PATENT DOCUMENTS

| 5,872,548 | A | * | 2/1999 | Lopex ........................ 343/890 |
| 5,920,478 | A | | 7/1999 | Ekblad et al. |
| 6,067,053 | A | * | 5/2000 | Runyon et al. ............. 343/797 |
| 6,094,165 | A | * | 7/2000 | Smith ......................... 342/373 |
| 6,127,971 | A | * | 10/2000 | Calderbank ................ 342/368 |
| 6,323,823 | B1 | * | 11/2001 | Wong et al. ................ 343/844 |
| 6,339,407 | B1 | * | 1/2002 | Gabriel et al. ............. 343/797 |
| 6,347,234 | B1 | * | 2/2002 | Scherzer ..................... 455/562 |
| 6,519,478 | B1 | * | 2/2003 | Scherzer et al. ........... 455/562 |
| 6,542,556 | B1 | * | 4/2003 | Kuchi et al. ................ 375/299 |
| 2002/0154705 | A1 | * | 10/2002 | Walton et al. ............. 375/267 |

FOREIGN PATENT DOCUMENTS

| EP | 0 895 436 A | 2/1999 | ............ H04Q/7/36 |
| FR | 2 779 873 A | 12/1999 | ............ H01Q/3/30 |
| GB | 2 191 044 A | 12/1987 | .......... H01Q/21/24 |

OTHER PUBLICATIONS

Wang, Y. et al.: "An Array Antenna System of Angular Beam Steering and Polarization Agility," from Pioneers to the 21$^{st}$ Century, Denver, May 10–13, 1992, Proceedings of the Vehicular Technology Society Conference (VTSC), New York, IEEE, US, vol. 2 Conf. 42, May 10, 1992. pp. 21–24, XP01006452, ISBN: 0–7803–0673–2, the whole document.
Passman, C. et al.: "A Polarization Flexible Phased Array Antenna for a Mobile Communication SDMA Field Trial," Microwave Symposium Digest, 1997., IEEE MTT–S International Denver, Co., USA 8–13, Jun., 1997, New York, NY, USA, IEEE, US, Jun. 8, 1997, pp. 595–598, XP010228402, ISBN: 0–7803–3814–6, the whole document.
Golden, G.D., et al.: "Detection Algorithm and Initial Laboratory Results Using V–Blast Space–Time Communication Architecture," Electronics Letters, IEEE Stevenage, GB, vol. 35, No. 1, Jan. 7, 1999, pp. 14–16, XP006011643, ISSN: 0013–5194, the whole document.
European Search Report dated Apr. 24, 2002.

* cited by examiner

Primary Examiner—Edward F. Urban
Assistant Examiner—C. Chow
(74) Attorney, Agent, or Firm—Stephen M. Gurey

(57) ABSTRACT

An antenna array comprising at least two groups of antennas where each group comprises at least two pairs of antennas. Each of the pairs in a group contains orthogonally polarized antennas and at least one antenna in a pair is similarly polarized to one antenna in at least another pair in the group. The antenna array further comprises circuitry coupled to the antenna groups to select and activate certain antennas in a group to enable the antenna array to operate in either a beam forming/steering mode, a diversity mode or a MIMO mode or any combination thereof. The antennas in the groups are activated based on the characteristics of the signals being transmitted or received by the antenna array.

14 Claims, 2 Drawing Sheets

STRUCTURE FOR MULTIPLE ANTENNA CONFIGURATIONS

BACKGROUND OF THE INVENTION

1. Field of the Invention

The present invention generally relates to a multiple antenna system that can operate in either multiple input multiple output (MIMO) mode, a beam forming/steering mode or a diversity mode.

2. Description of the Related Art

Many communication systems, and in particular, wireless communication systems use antennas to convey (i.e., transmit and receive) communication signals. In many cases, a plurality of antennas is used to convey the signals. The plurality of antennas, commonly referred to as an antenna array, is often used to increase the amount of information (e.g., information transfer rate or throughput) that is being conveyed or to improve the quality of a signal being transmitted (or received) by the antenna array. One technique used with antenna arrays to improve the quality of a signal being transmitted (or received) is called spatial diversity.

Spatial diversity is the selection of a particular antenna or a group of antennas from an array of antennas to transmit (or receive) a communication signal. A signal transmitted with a spatially diverse structure will have the signal taking different paths to its ultimate destination. An example of a transmit diversity scheme is space time spreading (STS) which is used as part of the standard for IS-2000 wireless communication networks. To further improve the quality of a transmitted spatially diverse signal, the transmitted diverse signal can also be processed by a beam forming/steering device; beam forming/steering in combination with STS is called Steered STS. In beam forming/steering or Steered STS the antenna is coupled to a device which controls the relative phase of the signal being transmitted by each antenna in order to form a focused beam in a particular direction in space. The beam can control gains (transmit or receive) for specific users or can control gains based on the direction of the signal. Also the gain can be related to only the signal strength or both the signal strength and interference strength thus maximizing the Carrier to Interference ratio (C/I). The Steered STS technique can be used in many wireless communication networks. A similar scheme called Space Time Transmit Diversity (STTD) has been defined for Universal Mobile Telecommunications System (UMTS) networks. The steered STS approach can be used with any diversity schemes such as STS or STTD.

Another technique used with antenna arrays is called multiple input multiple output (MIMO). Unlike spatial diversity techniques wherein a group of antennas is used to transmit (or receive) a single signal, MIMO techniques use an antenna array coupled to a signal processing device (including transmission and reception circuitry) to simultaneously transmit and/or receive multiple distinct signals. A particular example of a MIMO system is the BLAST (Bell Labs LAyered Space Time) scheme conceived by Lucent Technologies headquartered in Murray Hill, N.J. In BLAST each transmit antenna is used to either transmit or receive distinct signals. Various coded BLAST schemes exist (e.g., diagonal BLAST or D-BLAST; vertical BLAST or V-BLAST) where each signal is coded prior to being transmitted. In a BLAST device that uses coding, often the same code is used for each of the distinct signals; this is called code reuse.

Antenna arrays are typically intended to operate in multipath environments in which communication signals transmitted by an antenna do not propagate in a straight line towards a receive antenna. Rather, in a multipath environment, the communication signals scatter off various objects (e.g., buildings, trees) located between a transmit antenna and a receive antenna. Thus, a multipath environment creates a multitude of possible paths for a signal going from a transmit antenna to a receive antenna. The BLAST technique exploits a multipath environment by using multiple transmitters and receivers to create, in effect, a plurality of independent subchannels each carrying independent information. The communication signals occupy the same bandwidth simultaneously and thus spectral efficiency increases with the number of independent subchannels. Theoretically, the more scattering that occurs in the multipath environment, the more subchannels that can be supported. Therefore, antenna arrays of a communication system that use the BLAST technique serve to increase the information throughput of a communication network.

For certain situations and for certain types of communication signals, it is desirable to use one technique over another. For example, for voice signals where the quality of the voice signal being transmitted and the capacity (i.e., number of voice users supported) are crucially important, it is typically advantageous to use beam forming/steering. In other situations in which data signals (i.e., text, graphics, Internet data) are being transmitted, the issue of information throughput is often paramount compared with other factors thus making usage of MIMO techniques desirable in such circumstances. The configuration of antenna arrays for the two techniques (beam forming/steering and MIMO) have contradicting spatial requirements. In particular, antenna arrays that perform beam forming/steering exploit the correlation aspects of the signals being transmitted by antenna elements proximately positioned with respect to each other.

Signal correlation is a phenomenon whereby the variations in the parameters (i.e., amplitude and phase) of a first signal of a first antenna track the variations in the parameters of a second signal of a second antenna in the vicinity of the first antenna. In general, as the spacing between antennas increases, the correlation between signals being transmitted (or received) by the antennas decreases. Conversely, as the spacing between antennas decreases, the correlation between signals being transmitted (or received) by the antennas increases. To achieve relatively highly correlated signals in typical wireless communication systems, the spacing between antennas is of the order of $$\frac{1}{2}\lambda$$

or less where $\lambda$ is equal to $$\frac{c}{f}$$

which is the wavelength corresponding to the largest frequency ($f$) within a band of frequencies at which the antennas are operating; $c$ is the well known constant representing the speed of light in vacuum. It is desirable to have relatively high correlation between signals transmitted (or received) by antennas being used for beam forming/steering applications such as Steered STS. On the other hand, it is desirable to have a relatively low correlation or no correlation between antennas when they are used for MIMO applications such as BLAST or diversity applications.

Communication systems may use antenna arrays configured to perform beam forming/steering through the use of steered STS. In many situations, these same communication systems have a need to have BLAST capability or diversity capability. In order to perform BLAST operations with their current antenna configurations, such communication systems have to deploy additional antennas appropriately spaced with respect to each other and to the existing antennas. Not only is the deployment of additional antennas a cost increase for service providers, it also presents an environmental and esthetic concern for many communities within which communication towers comprising base station equipment and antennas are located. Service providers are entities that own, operate and control communication networks and their associated equipment. What is therefore needed is an antenna array in which beam forming/steering, MIMO and diversity operations can be performed on signals being transmitted and/or received without having to deploy additional antennas. What is further needed is an antenna array configuration that can perform either MIMO or beam forming/steering or diversity operations, or an antenna array, which simultaneously performs beam forming/steering, MIMO, diversity operations or any combination thereof.

SUMMARY OF THE INVENTION

The present invention is an antenna array comprising at least two antenna groups where each group comprises at least two pairs of antennas where each pair selectively operates in either a MIMO mode, a beam forming/steering mode, a diversity mode or any combination thereof. Each pair of antennas within a group is orthogonally polarized and each antenna in a pair is selectively activatable. One antenna from at least one of the pairs in the group is similarly polarized with one antenna from at least one other pair in the group. A first group of antennas is positioned with respect to a second group of antennas such that there is relatively low correlation or no correlation between signals being transmitted (or received) by any one of the antennas from different groups. The groups are configured such that they operate either in a MIMO mode, a beam forming/steering mode, a diversity or any combination thereof. The groups in the antenna array are coupled to circuitry that cause certain antennas in a group to be selected and activated so that each group is able to operate in any one of the aforementioned modes.

The antenna groups are coupled to the circuitry via switches which are activated by control signals from the circuitry or are designed to automatically route signals to certain antennas based on certain characteristics of the signals to be transmitted and/or being received. The switches are designed such that they are able to determine certain characteristics from a signal and route that signal to a proper antenna such that the corresponding group to which the switch is coupled can operated in either the MIMO, beam forming/steering or diversity modes. In a preferred embodiment of the present invention, the circuitry is able to determine certain characteristics of signals to be transmitted or being received by the antenna array and, based on the determined characteristics, generate control signals which activate the proper switches that activate certain antennas in a group to cause the group to operate in any one of the three modes or any combination of the three modes. In this manner, different groups can operate in the same mode or in different modes as determined by the circuitry.

DETAILED DESCRIPTION

The present invention is an antenna array comprising at least two antenna groups where each group comprises at least two pairs of antennas where the two pairs selectively operate in either a MIMO mode, a beam forming/steering mode, a diversity mode or any combination thereof. Each pair of antennas within a group is orthogonally polarized with respect to each other and each antenna in a pair is selectively activatable. One antenna from at least one of the pairs in the group is similarly polarized to one antenna from at least one other pair in the group. A first group of antennas is positioned with respect to a second group of antennas such that there is relatively low correlation or no correlation between signals to be transmitted (or being received) by any one of the antennas from different groups. The groups are configured and are positioned with respect to each other such that any group operates either in the MIMO, beam forming/steering or diversity modes or such that the groups operate in any combination of the three modes. The antennas of the present invention need not all operate at the same frequency. The particular frequency at which any specific antenna operates depends on various electrical and mechanical characteristics of the antenna. Therefore, the antenna array of the present invention encompasses arrays in which all of the antennas operate at the same frequency or operate at frequencies falling within a defined range of frequencies. Thus an antenna is said to be operating at frequency, $f$, when it is able to receive (or transmit) signals having frequencies, $f$, or other frequencies falling within the defined range of frequencies where $f$ is the highest frequency in the defined range and is equal to $$\frac{c}{\lambda}; \lambda \left(\text{equal to } \frac{c}{f}\right)$$

is the corresponding wavelength of the signal to be transmitted (or being received) by the antenna. The antennas from the groups constituting the antenna array of the present invention are coupled to circuitry that is operated to cause certain similarly or orthogonally polarized antennas from a group to be selected and activated thus enabling the antenna array to perform beam forming/steering, diversity or MIMO operations or any combination of all three operations simultaneously.

Figure 1:
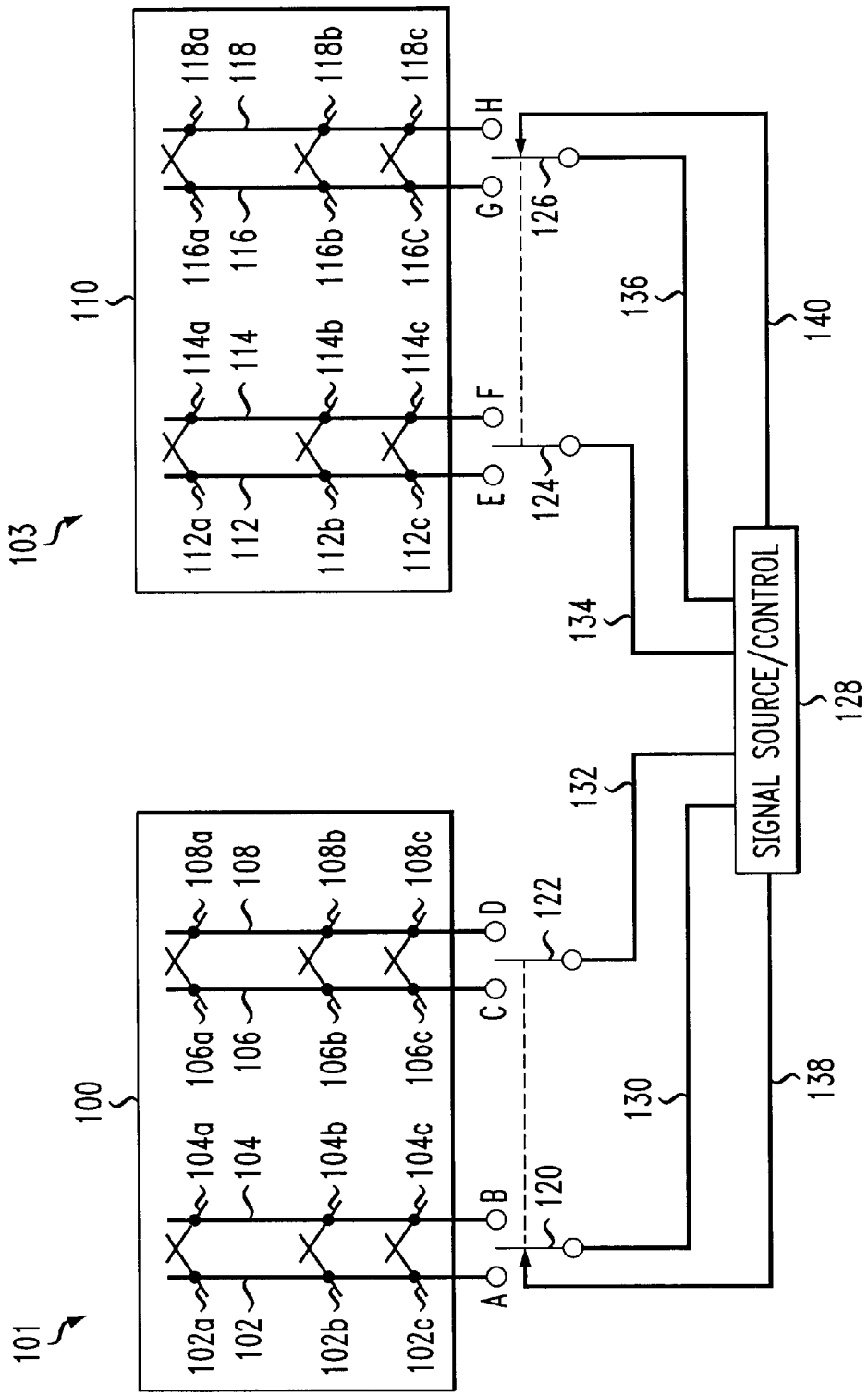
FIG. 1 depicts a two-group antenna array version of the present invention.

Referring to FIG. 1, there is shown the antenna array of the present invention. For ease of explanation, FIG. 1 shows two groups of antennas where each group contains two pairs of antennas. It will be readily understood that the antenna array of the present invention is not limited to two-pair antenna groups and to two-group antenna arrays. Also, for ease of explanation, the antenna array of the present invention will be described in terms of transmitting antennas. The present invention also applies to antennas that are used to receive signals. The transmit and receive antennas can use the same type of polarizations or different types of polarizations. The present invention comprises antenna arrays (receive and transmit) that use any combination of different polarizations in groups within an array.

The first group (101) comprises a first pair of antennas (antennas 102 and 104) and a second pair of antennas (antennas 106 and 108). Note that each antenna has a multiple of antenna elements. The present invention is not limited to any particular number of antenna elements contained in each antenna. Thus, for illustrative purposes only, antenna 102 is shown to have three antenna elements, viz., antenna elements 102a, 102b and 102c. Antenna 104 has antenna elements 104a, 104b and 104c. Similarly, in the second pair of the first group, antenna 106 has antenna elements 106a, 106b and 106c and antenna 108 has antenna elements 108a, 108b and 108c.

Each antenna pair in each group has orthogonally polarized antennas. Thus, for group 101, all of the antenna elements of antenna 102 are horizontally polarized while all of the antenna elements of antenna 104 are vertically polarized. Likewise, antenna elements of antenna 106 are horizontally polarized and antenna elements of antenna 108 are vertically polarized. It is well known that signals transmitted into a multipath environment from orthogonally polarized antennas (regardless of the respective distances between the orthogonally polarized antennas) are uncorrelated to each other. The polarization used can be either linear polarization (i.e., vertical/horizontal or ±45°), circular polarization (i.e., right hand or left hand) or any other well known polarization techniques. Similarly polarized antennas are antennas whose polarization orientations are the same or substantially the same, e.g., two vertically polarized antennas or two right hand circular polarized antennas. The first group of antennas is enclosed within an enclosure 100 called a radome.

The antenna array of the present invention is further configured such that similarly polarized antennas within a group are positioned with respect to each other such that they are able to transmit (or receive) signals which are relatively highly correlated to allow for beam forming/steering operations. For example, in group 101, antennas 102 and 106 or antennas 104 and 108 are positioned such that they transmit (or receive) relatively highly correlated signals when selected and activated. An activated antenna refers to an antenna that is either transmitting or receiving communication signals. Preferably, the distance separating similarly polarized antennas is $$\frac{\lambda}{2}$$

or less. It should be noted, however, that the antenna array of the present invention is not limited to similarly polarized antennas (within a group of antennas) positioned at a distance of $$\frac{\lambda}{2}$$

from each other. The distance between similarly polarized antennas can be greater or less than $$\frac{\lambda}{2};$$

it does not have to be exactly $$\frac{\lambda}{2}.$$

The first group of antennas has switches 120 and 122 positioned to select either antennas in each of the antenna pairs. The selected antenna is thus activated by a signal present in path 130 corresponding to switch 120 or path 132 corresponding to switch 122. The switches are operated either electronically, electrically or electromechanically through means well known to those skilled in the art to which this invention belongs. For example, a signal on path 138 causes switch 120 to be set to position A or B and switch 122 to be set to position C or D. Signal source/control circuit 128 comprises well known signal processing, transmission and/or reception circuitry for generating similar or distinct signals (on paths 130, 132, 134 and 136) depending on the mode in which the groups are operating thereby activating the selected antennas. For example, signal source/control circuit 128 can be the radio and processing equipment typically used at a base station of a wireless communication network. Signal source/control circuit 128 also comprises control circuitry which when operated causes switches 120, 122, 124 and 126 to be set to certain positions to operate the groups of antennas in either the beam forming/steering mode, the MIMO mode, the diversity mode or any combination thereof.

Signal source/control circuit 128 along with the switches (120, 122, 124 and 126) can be designed to route signals appearing on paths 130, 132, 134 and 136 to be automatically routed to certain antennas based on characteristics of the signals so that any group in the antenna array can operate in either of the three modes. In other words, the switches can be designed to perform self-routing based on the characteristics of the signals appearing on paths 130–136. For example, suppose the antenna array of FIG. 1 is part of equipment used in a Time Division Multiple Access (TDMA) communication network providing voice services (i.e., transmission and reception of voice signals) to some subscribers and data services (i.e., transmission and reception of digital information) to other subscribers. Voice signals are allowed to be transmitted during certain distinct time slots while data signals are allowed to be transmitted during other distinct time slots. Typically, beam forming/steering is a desirable operation to be performed on voice signals while diversity and/or MIMO operations are desirable for data signals. Therefore, the switches (120–126) and signal source/control circuit 128 can be designed to determine the characteristic (e.g., assigned slot) of signals to be transmitted (or received) and route voice signals to one or more antenna groups whose antennas are activated so that such groups beam forming/steering operations and route data signals to antenna groups whose antennas are activated so that they perform diversity or MIMO operations. In similar ways one can design other self routing mechanisms (e.g., code division) to route specific signals to one specific set of antennas (to employ one mode) while simultaneously route another set of signals to another set of antennas (to employ another mode).

The determination and routing of the signals can be done in either two ways. One way is for signal source/control circuit 128 to determine the type of signal (based on signal characteristics) appearing on paths 130, 132, 134 or 136 and generate control signals on paths 138 and 140 to set the switches to certain positions thus routing the signals to be transmitted and/or received by the antenna array to certain antennas in certain groups allowing the respective antenna groups to operate in either the MIMO, diversity or beam forming/steering modes or any combination thereof. Although not shown in FIGS. 1 and 2, another way is for the switches themselves to route the signals (on paths 130, 132, 134, and 136) based on the characteristics (e.g., frequency content, amplitude, phase, code, time slot) of the signals. Thus, the switches can be designed to be able to process the signals (to be transmitted or being received), determine the characteristics of the signals and route the signals accordingly to allow the antenna array of the present invention to operate in either one of the three modes or operate in any combination of the three modes.

Other signal characteristics that can be used will depend on the type of communication network for which signal source/control circuit 128 is used. For example, for Code Division Multiple Access (CDMA) networks, each signal associated with a particular subscriber is assigned a distinct code; the code can be ascertained by appropriate processing of the signal to be transmitted and/or being received. Depending on the value of the code, the switches can be designed to route signals having certain code values to certain antenna group or groups which will perform an operation (i.e., MIMO, diversity or beam forming/steering) associated with the code value. Similarly, for Frequency Division Multiple Access (FDMA) networks, which provide access to certain signals based on which frequency spectrum the signals are located, the switches can route the signals to certain antennas in certain groups to allow these groups to operate in any one of the three modes.

Furthermore, the switches can be designed to route signals to allow certain groups in the antenna array to operate in any of the three modes based on the services associated with the signals. For example, communication networks provide voice services and data services simultaneously to subscribers. Each signal from a subscriber is associated with a particular service. The switches can be designed to determine the service with which a signal is associated and route the signals accordingly to allow certain groups of antennas in the antenna array to process such signals through MIMO, diversity or beam forming/steering operations.

Still referring to the first group, when switch 120 is set to position A and switch 122 is set to position C, the first group can perform beam forming/steering between signals on paths 130 and 132 since both signals are similarly polarized (both horizontally polarized) by antennas 102 and 106 respectively. Beam forming/steering for the first group can also be achieved by setting switch 120 to position B and switch 122 to position D in which case antenna 108 and 104 are selected and activated by signals on paths 130 and 132. Therefore, selecting similarly polarized antennas from a group of antennas allows the selected antennas to perform the beam forming/steering operation when activated.

The first group can also be configured to perform MIMO operations such as BLAST or perform diversity operations by selecting and activating orthogonally polarized antennas from the antenna pairs. In particular, when switch 120 is set to position A and switch 122 is set to position D antennas 102 and 108 are selected and are activated by signals on paths 130 and 132 respectively. The signals can be distinct signals that are to be transmitted or are being received using a BLAST code reuse technique or any other MIMO technique. The signals can also be distinct both being received or both being transmitted in a diversity operation. The signals being transmitted and/or received are uncorrelated to each other. Another example is where antenna 102 is receiving a signal while antenna 108 is transmitting another signal or vice versa and both signals fall within the same range of frequencies. Note also that MIMO and diversity operations can also be achieved when antennas 104 and 106 are selected and activated by setting switch 120 to position B and switch 122 to position C. Therefore, selecting orthogonally polarized antennas from a group of antennas allows the selected antennas to perform MIMO operations or diversity operations when activated.

Referring now to the second of group (103) of antennas comprising orthogonally polarized antenna pairs 112, 114 and 116, 118 each of which comprises three antenna elements (i.e., 122a–c, 114a–c, 116a–c and 118a–c). All of the antennas in the second group are located within radome 110. The second group (103) is positioned with respect to the first group such signals from any antenna in the second group is uncorrelated with any signals f from any antenna in the first group. Accordingly, the second group of antennas is preferably located a distance of at least $10\lambda$ from the first group. In other words, any antenna in the first group is positioned at a distance of at least $10\lambda$ from any antenna in the second group. In this manner, the first group can perform beam forming/steering while the second group performs MIMO (or diversity) operations or vice versa. Alternatively, both groups can perform MIMO operations or beam forming/steering operations or both groups can perform diversity operations. It will be readily understood by one skilled in this art that the distance between antenna groups is not limited to $10\lambda$; other distances (e.g., $5\lambda$, $6\lambda$, $15\lambda$) may be used to achieve de-correlation between signals from the different groups based on propagation environment. Therefore, the antenna array of the present invention is not limited to an array in which the antenna groups are located at a distance of $10\lambda$ from each other.

Antenna group 103 operates in the same manner as antenna group 101. In particular, when the second group operates in a MIMO mode (or diversity), switch 124 is set to position E while switch 126 is set to position H. Also, the second group operates in a MIMO mode (or diversity) when switch 124 is set to position F while switch 126 is set to position G. Switches 124 and 126 are designed in the same manner and operate in the same way as switches 120 and 122. For example switches 124 and 126 can be operated by a control signal on path 140 or they can determine the characteristics of signals on paths 134 and 136 and activate the antennas in group 103 to operate in any of the three modes (i.e., MIMO, diversity or beam forming/steering) by routing the signals (to be transmitted or being received) to certain antennas in group 103. Group 103 operates in the beam forming/steering mode when switches 124 and 126 are set to positions E (or F) and G (or H) respectively. The antennas of the second group are activated as in the first group, i.e., when there are signals present on paths 134 and 136. It will be readily understood that not all of the antennas from all the groups of the antenna array have to be activated. Beam forming/steering, diversity and/or MIMO operations can be performed in an array where some antennas in certain groups are not activated or where all antennas in certain groups are not activated.

Figure 2:
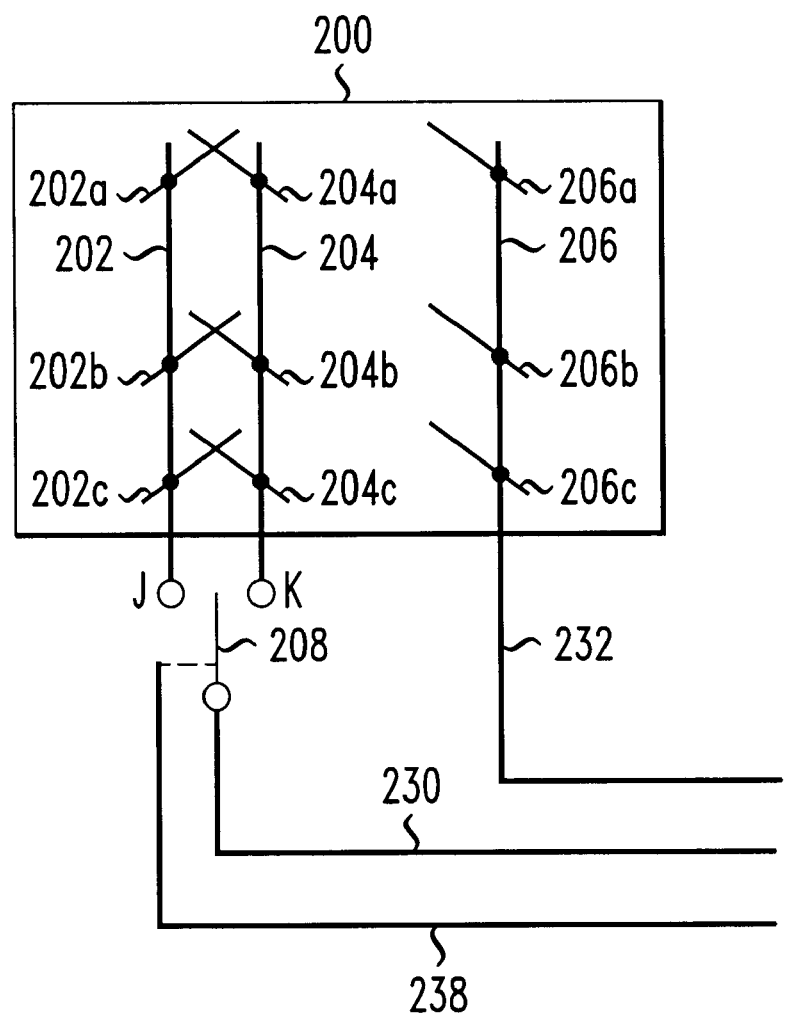
FIG. 2 depicts an alternate configuration for a group of antennas.

Referring now to FIG. 2, there is shown an alternative configuration for an antenna group. Antennas 202, 204 and 206 are located within radome 200. Each antenna has three antenna elements; antenna 202 has antenna elements 202a, 202b and 202c. Antenna 204 has antenna elements 204a, 204b, and 204c. Antenna 206 has antenna elements 206a, 206b and 206c. Switch 208 can be set either to position J or K to select antenna 202 or 204 respectively. Antenna 206 is permanently coupled to path 232. Antenna 206 is polarized similarly to antenna 204. Thus, when switch 208 is set to position K, the antenna group enclosed by radome 200 performs beam steering operations with signals on paths 230 and 232. Paths 230, 232 and 238 are coupled to circuitry (not shown) that generate communication signals and control signals. The control signals are placed on path 238 to operate switch 208. When switch 208 is set to position J, the antenna group operates in a MIMO mode or in a diversity mode. Switch 208 can also be designed to perform self-routing in the same manner as switches 120–126 of FIG. 1.

I claim:

1. An antenna array comprising:

at least one group of antennas comprising at least two pairs of antennas where each pair has orthogonally polarized antennas and at least one antenna from one pair is similarly polarized to at least one antenna from another pair; and switching circuitry coupled to the at least one group for dynamically reconfiguring the antenna array by selecting and activating certain antennas in the group based on characteristics of signals to be transmitted and/or being received by the antenna array or on an external control signal, based on which antennas are selected and activated by the switching circuitry, the antenna array being able to independently and simultaneously operate on different signals in a beam forming/steering mode, a MIMO BLAST mode, and/or a diversity mode, wherein some of the antennas that are selected and activated for one of the modes are also selected and activated for at least another one of the modes.

2. The antenna array of claim 1 where the at least two antenna pairs are separated by a distance of $$\frac{\lambda}{2}$$

where $\lambda$ is equal to $$\frac{c}{f}$$

where c is a mathematical constant representing light speed in a vacuum and f represents a frequency at which the at least two antenna pairs are operating.

3. The antenna array of claim 1 where any antenna in a first group is positioned at a distance of $10\lambda$ from any antenna in another group where $\lambda$ is equal to $$\frac{c}{f}$$

where c is a constant representing light speed in a vacuum and f represents a frequency at which the antenna pairs in the groups are operating.

4. The antenna array of claim 1 where the circuitry selects and activates at least two similarly polarized antennas in the at least one group to enable the antenna array to operate in the beam forming/steering mode.

5. The antenna array of claim 4 where the beam forming/steering mode is a Steered STS mode.

6. The antenna array of claim 1 where the circuitry selects and activates at least two orthogonally polarized antennas in the at least one group to enable the antenna array to operate in the MIMO mode.

7. The antenna array of claim 1 where the circuitry selects and activates at least two orthogonally polarized antennas in the at least one group to enable the antenna array t operate in the diversity mode.

8. The antenna array of claim 1 where the antennas in the at least one group operate at one frequency or in a same range of frequencies.

9. The antenna array of claim 1 where the switching circuitry comprises:

switches used to select antennas from the at least one group of antennas; and signal transmission and/or reception circuitry for activating the selected antennas.

10. The antenna array of claim 9 where the switches route the signals to be transmitted and/or received based on services associated with the signals.

11. The antenna array of claim 9 where the switches route the signals to be transmitted and/or received based on signal characteristics determined by the switches.

12. The antenna array of claim 9 where the signal transmission and/or reception circuitry generates control signals causing the switches to route certain signals to certain antennas within a group of antennas.

13. The antenna array of claim 1 where each of the antennas in the at least one group comprises a multiple of antenna elements.

14. The antenna array of claim 1 where the at least one group comprises a pair of orthogonal polarized antennas and a single antenna where the single antenna is similarly polarized to one of the antennas in the pair.

* * * * *